No. 647,339. Patented Apr. 10, 1900.
I. M. B. THOMPSON.
APPARATUS FOR MECHANICAL DRAWING.
(Application filed Aug. 2, 1899.)
(No Model.) 2 Sheets—Sheet 1.

Fig. I.

WITNESSES
Mary E. Ballinger
Elizabeth P. Thompson

INVENTOR.
Isaac M. B. Thompson

No. 647,339. Patented Apr. 10, 1900.
I. M. B. THOMPSON.
APPARATUS FOR MECHANICAL DRAWING.
(Application filed Aug. 2, 1899.)

(No Model.) 2 Sheets—Sheet 2.

WITNESSES: INVENTOR:

UNITED STATES PATENT OFFICE.

ISAAC M. B. THOMPSON, OF HADDONFIELD, NEW JERSEY.

APPARATUS FOR MECHANICAL DRAWING.

SPECIFICATION forming part of Letters Patent No. 647,339, dated April 10, 1900.

Application filed August 2, 1899. Serial No. 725,933. (No model.)

*To all whom it may concern:*

Be it known that I, ISAAC M. B. THOMPSON, a citizen of the United States, residing at Haddonfield, in the county of Camden and State of New Jersey, have produced a new and useful improvement in devices employed in the production of polygons and other plane geometric and ornamental figures and patterns, of which the following is a specification.

My invention relates especially to a class of apparatus consisting of a chart bearing a series of concentric circular lines and a series of radial lines, designed to aid in the ascertainment of the construction points of polygonals and other figures or patterns, which points when determined and transferred to the drawing surface, serve as guides for rulers, compasses, and kindred instruments in the hands of the user.

Devices of this character find their widest application in the production of regular polygonal figures.

My invention aims to provide a chart or device of the foregoing general character, which, by reason of the special arrangement of its guide lines and indicators has a very extended range of utility in that from its relatively small number of guide lines may be produced the salient construction points of a large number of polygonal and other figures.

Thus my improved device is provided with guide lines in such arrangement that each radial line is common to several distinct figures, said lines, furthermore, by reason of a special grouping of terminations at selected points not only enhancing the facility with which the device may be used but afford ample spaces for the application of indicating figures or marks.

In the construction of that part of the chart to which the invention particularly relates, I have utilized the principle that polygonal figures may be classified in various groups according to the number of their angles or construction points, as I hereinafter term them, each group including several polygons the members of which have such number of construction points that the number possessed by that member of the group having the greatest number of angles is the least common multiple of the numbers possessed by each of the other members of the group.

The groups which relate to the polygonal figures most ordinarily dealt with may be stated as follows:—

I those with 3, 6, 12, and 24, points respectively,

II those with 4, 8, 16, and 32, points respectively,

III those with 5, 10, and 20, points respectively,

IV those with 7 and 14 points respectively,

V those with 9 and 18 points respectively

VI those with 11 and 22 points respectively.

In consequence of the relation stated between the various members of each group, it follows that in their formation certain points of said figures may be made to coincide.

Therefore in the construction of my chart a single line or point is utilized to indicate for example a construction point common to three or four different figures.

It is an object in the apparatus of this kind not only to employ it or render it useful in connection with the construction of as large a number of figures as possible, but also to reduce the amount of marks, lines, and indicators, because said lines and indicators not only tend to crowd the page or sheet, and become confused with each other, but also render necessary the employment of very small indicating figures.

In the arrangement of my device just referred to, employment of one line for a construction point common to a number of figures in a group, dispenses with the employment of a certain amount of markings otherwise necessary.

On my device, as shown in the accompanying drawings, are printed or formed a series of concentric circles, and a series of radial lines by groups of dissimilar lengths, and which according to their length, intersect all or part of the circles.

In classifying the groups I in effect segregate so to speak, the radial guide lines of each group from those of the other groups by terminating them as to their outer ends at the points where they intersect a selected circle; terminating the lines of no other group on such circle,—thus in effect rendering such circle peculiar to such group of radial lines.

Said radial lines extend inward and terminate at points more or less remote from the center, being so distributed that I may if desired apply to the inner ends of the lines the same numerals or indicators applied to their outer ends.

The arrangement described, by virtue of which the radial lines relating to one group only terminate on a given circular line, avoids the necessity for close attention in use that would be called for were all the lines extended to the outermost circle and the groups themselves intermixed, and affords ample space on the face of the chart for figures or indicators of large and easily observed size.

In the accompanying drawings.

Figures 2, 3:
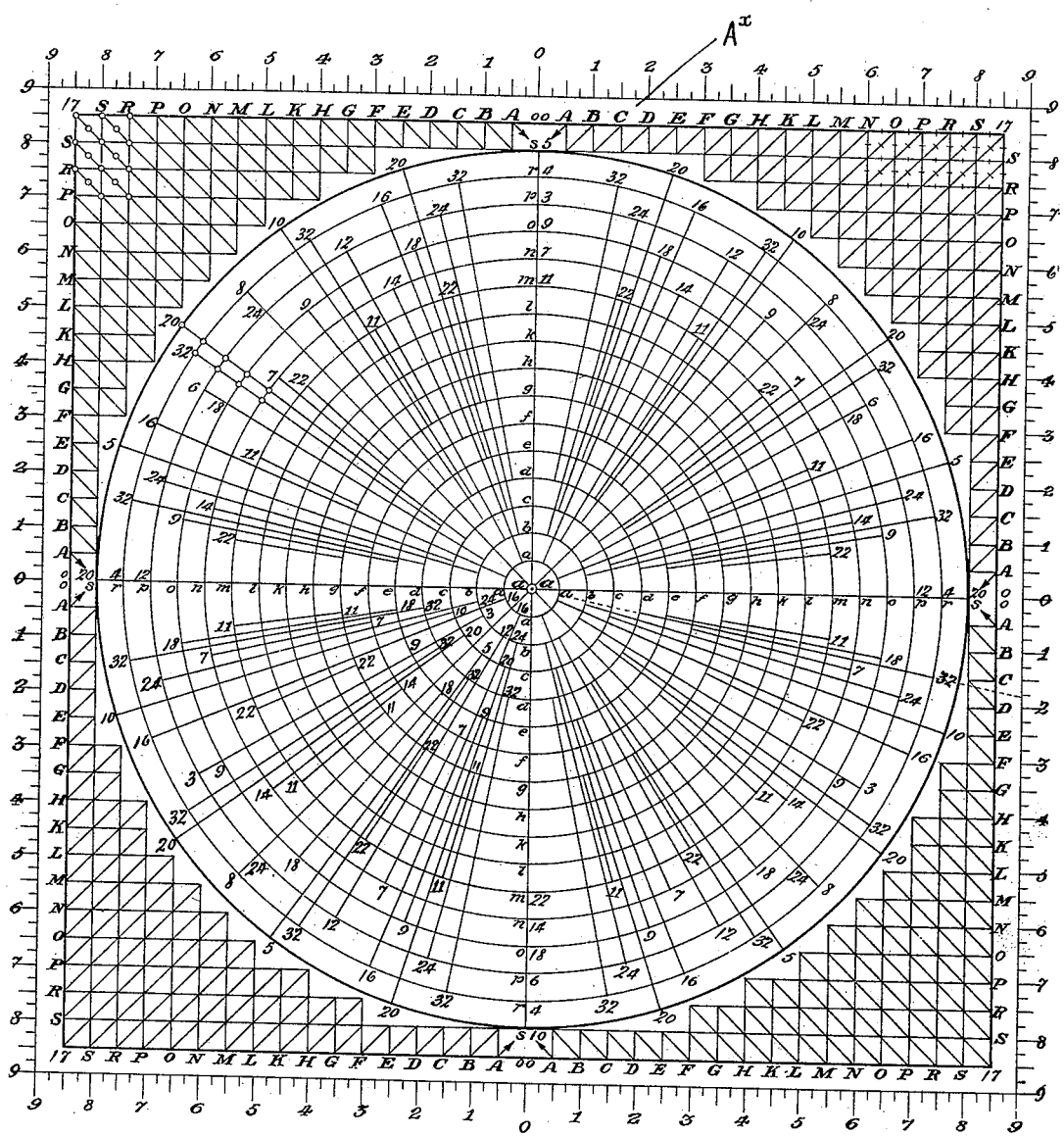
Figure 2 is a top plan view on a reduced scale of the entire chart, certain minor details being omitted.
Figure 3 is a detail of the central portion of the chart.

In the accompanying drawings I apply the designation $A^\times$ to the body of the sheet or chart, and the letter $B^\times$ to the plate at the center of figure 3.

The chart, as I term it, is provided, in the precise form shown, with a series of sixteen concentric circular lines, designated $a$, $b$, $c$, $d$, $e$, $f$, $g$, $h$, $k$, $l$, $m$, $n$, $o$, $p$, $r$, and $s$.

The circles are all intersected by a vertically-disposed line and a horizontally-disposed line which of course bisect each other at a point coincident with the axis of the circles.

These lines I form as the foundation lines, the upper half portion of the vertical line being what I term the starting line.

The letters which are applied to the circles as above stated are preferably applied to each said circles at four points in the vicinity respectively of the intersections of the foundation lines with said circles.

The polygons which I include in, for example, the second group, are those with four, eight, sixteen, and thirty-two points, respectively.

Figure 1:
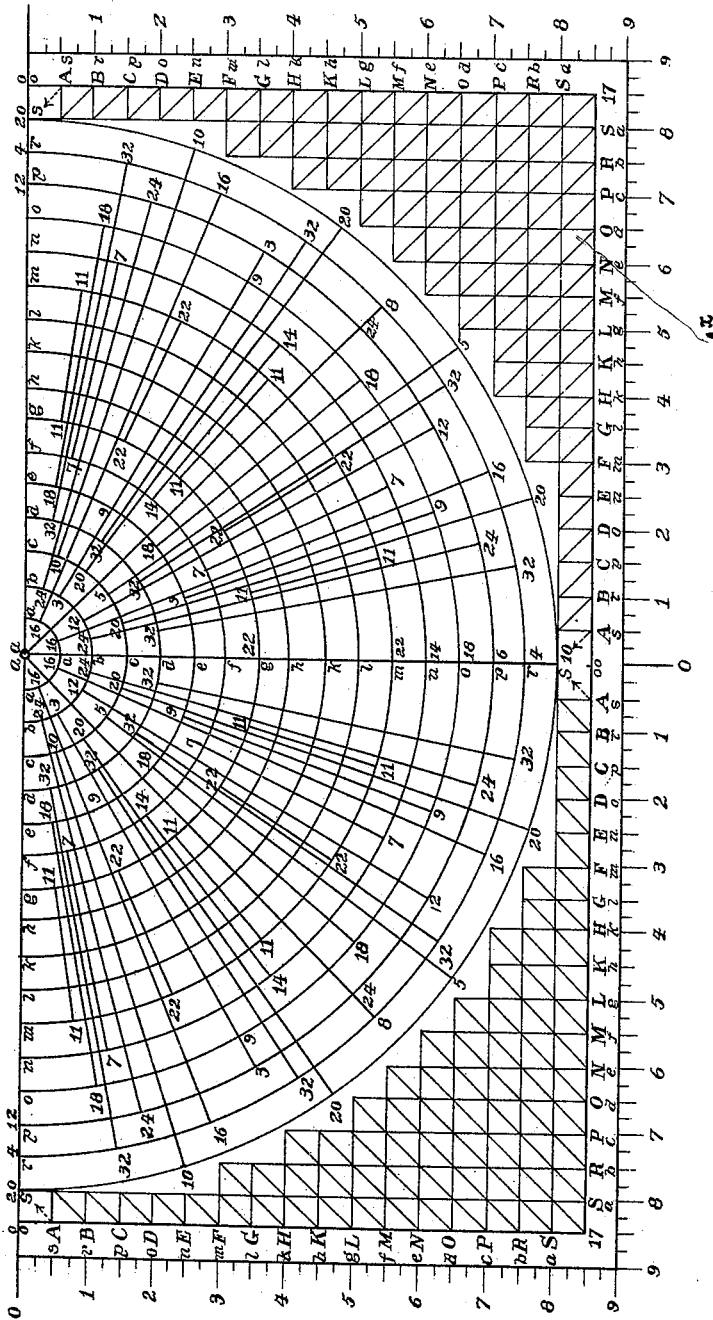
Figure 1 is a plan view of the one-half part of a chart embodying my invention.

I divide the line $r$ into thirty-two equal parts and from each point of division I extend from said line a radial line, said radial lines being carried inward any desired distance, but except in the case of the foundation lines, preferably terminating sufficiently far from the center to afford space for the application of figures to their inner ends, as shown particularly in figure 1 and the lower left hand portion of figure 2.

In the drawings the lines marked "8" are, however, shown as extending to the center.

To each of four equi-distant points on said line $r$, I apply the numeral "4."

At the four points which are midway between the respective points first mentioned I apply the figures "8."

At the points midway between each "4" and its adjacent "8" I apply the numerals "16."

At all of the remaining points I apply the numerals "32."

When, then it is desired to construct a polygon of for instance four sides, marks should be made on the drawing surface corresponding to the positions of the four figures "4," and said marks connected by right lines.

In the form of my invention illustrated the same result will follow the making of the marks corresponding to the positions occupied by the figures "8."

When a polygon of eight points or sides is desired the points should be made corresponding to the positions of all of the figures "8," and all of the figures on the same circular line below "8," in this instance of course the figures "4."

When said points corresponding to the positions of said figures "8" and "4" are connected by right lines, an eight-sided polygon will result.

When it is desired to construct a polygon of sixteen points, markings are made corresponding in position to all the figures "16" on said line, and corresponding to the positions of all of the figures below "16", namely "8" and "4."

When these points are all connected a polygon of sixteen sides or points will be produced.

When it is desired to produce the polygon having thirty-two sides, points are made on the surface where it is to be produced, corresponding in position to all of the numeral points on said line.

The description of the groups on the second line will apply with the necessary changes to all of the other groups.

When it is desired to form a polygon of eight, for instance, sides, but of diameter less than the diameter of the second circle, a circle of the desired size is selected from the series, and the points 8 and 4 are ascertained on the second circle and the radial lines corresponding to them traced or followed inwardly to the selected circle, and the construction points of the polygon produced on the drawing surface corresponding to the points of intersection of such radial lines with such selected circle.

In conducting the operation of carrying in the radial lines from the figures 8 and 4, and following around the selected smaller circle, the letter of the alphabet applied at four points to said circle will be of great assistance.

It will be observed that the starting line hereinbefore described, by reason of the fact that it serves as such starting line, forms a radial line of each polygon of all the groups.

As a result of this starting, so to speak, of the series of points of each polygon from a common point, the individual radial lines are so distributed or scattered that they do not come into very close proximity with each other or cause confusion.

The central circular figure formed by the circular and radial lines is inclosed in a plane rectangular figure having equal sides perpendicular respectively to the foundation lines, These bounding lines, as I term them, are divided into spaces corresponding to the distances apart of the successive circular lines, for example half an inch.

The divisions in said bounding lines are lettered consecutively from their centers toward their respective ends with large letters corresponding to those which are applied to the successively larger concentric lines.

The dividing points on each bounding line are the starting points for a numerically corresponding series of inwardly extending lines respectively perpendicular to the respective bounding lines and terminating in the vicinity of the outermost circle.

As a result of this arrangement each such inwardly extending line would if produced a sufficient distance touch one of the circles at the point where such circle crosses a foundation line.

For example, an inwardly extending line drawn from any of the points marked N will touch the circle designated $n$ at the point where it crosses a foundation line.

The small squares formed by the intersecting inwardly extending lines are also preferably divided by diagonal lines.

These diagonal lines will be found of assistance in the use of the chart.

I may, as shown in figure 1, apply to the margin of the chart, in the vicinity of the outer end of each diagonal line, a small letter which will indicate the point on a foundation line in the circular body of the chart, which would be encountered by said diagonal line if sufficiently developed toward the center, that is to say, referring to figure 1, the diagonal line $n$ if projected upon the face of the circular figure would reach the intersection of the circular line $n$ with the adjacent foundation line.

When for instance it is desired to produce, in the exigencies of the outlining of various figures of more or less complication, two lines intersecting each other at right angles at any particular point of the central portion of the figure, this may be done by extending two appropriate diagonal lines inward.

Thus, for instance, at the top of figure 2, if two diagonal lines starting at the letters N are carried inward they will meet at the point $e$.

If said lines are desired to intersect at some other point, one of said lines starting at the letter N for instance may be extended, and from the opposite side of the chart any other diagonal line which will produce the intersection at the desired point is extended inward.

In any event any diagonal line extended inward will form an angle of forty-five degrees with the adjacent foundation line.

The numerous squares formed by the intersecting inwardly extending lines, formed symmetrically arranged points about the central figure of use in the construction of combinations of figures.

All such lines and points could, of course, be made by an expert draftsman with instruments without difficulty. My improved chart, however, is especially designed for those not skilled in the employment of draftsman's instruments.

At the right hand upper corner of figure 2 I show the inwardly extending lines and the diagonal lines as provided with short intersecting markings.

These occur on the inwardly extending lines midway between the points of intersection of the perpendicularly disposed inwardly extending lines. They occur on the diagonal lines at the central points of the squares in which said diagonal lines are disposed.

These intersecting markings are of obvious use in the employment of the inwardly extending lines and diagonal lines where additional sub-divisions of the lines are desired.

Manifestly the mechanical transfer of the points ascertained on my improved chart to the drawing surface where the figure is to be produced may be effected in any desired way.

The chart may be made of heavy material with perforations at the various intersecting points (as shown in the upper left hand corner of figure 2) through which a pencil may be entered for the making of a mark upon a drawing surface beneath.

The chart may be made on paper or tracing cloth and the points taken from said tracing cloth through carbon paper.

If the chart be made on tracing cloth or light material I prefer to provide it with a metal or other hard plate having a recess or opening at its center to serve as a resting point for one leg of a pair of compasses, as shown in Figure 3.

Upon the margin of the chart may be drawn graduated markings indicating length measures, such as inches and fractions thereof.

In the drawings, to avoid crowding of figures, I show the graduated line referred to, and the numerals applied thereto, as formed on the sheet outside of the body of the chart.

The rectangular bounding lines with the inwardly extending lines and diagonal lines, arranged in the described relation to the concentric circles, are useful in plotting figures.

If desired the perforations shown in Figure 2, may be formed wherever lines intersect, and in the centers of the small squares, and wherever desired.

Having thus described my invention, I claim—

1. A device employed in the production of polygonal and other figures, consisting of a body a plane of which is provided with a series of concentric circles, and a series of long radial lines each crossing a number of said circles, the outer ends of which radial lines terminate as to some at one end and as to others at another, distance from the center, said radial lines serving to indicate by their intersections with the circles the points from which geometric figures may be developed, substantially as set forth.

2. A device employed in the production of polygonal and other figures, consisting of a body a plane of which is provided with a series of concentric circles, a group of equi-distant radial lines, which cross a number of the circles, and which terminate as to their outer ends at one of the circles, and a second group of equi-distant radial lines, differing in distribution from the series first mentioned, which cross a number of the same circles crossed by the radial lines of the first group, and terminate at a circle other than that at which terminate the lines of the first group, substantially as set forth.

3. A device employed in the production of polygonal and other figures, consisting of a body a plane of which is provided with a series of concentric circles, a group of equi-distant radial lines which cross a number of the circles and which terminate as to their outer ends at one of said circles, a second group of equi-distant radial lines differing in distribution from the series first mentioned, which cross a number of the same circles crossed by the radial lines of the first group, and terminate at a circle other than that at which terminate the lines of the first group, indicating marks applied at the ends of the lines of the first group, other indicating marks applied at the ends of the lines of the second group, substantially as set forth.

4. A device employed in the production of polygonal and other figures, consisting of a body a plane of which is provided with a series of concentric circles, a group of equi-distant radial lines which cross a number of said circles and terminate as to their outer ends at one of the circles, a second group of equi-distant radial lines differing in distribution from the series first mentioned, the outer extremities of which terminate on a circle other than that last above referred to, a series of numbers applied at the ends of the first series of radial lines, and a series of other numbers applied at the ends of the second series of radial lines, the highest number on a given circle indicating the whole number of radial lines terminating on such circle, and other numbers on said circle being divisors of said highest number, substantially as set forth.

5. A device employed in the production of polygonal and other figures, consisting of a body a plane of which is provided with a series of concentric circles, a group of equi-distant radial lines which terminate as to their outer ends at one of said circles, a second group of equi-distant radial lines differing in distribution from the series first mentioned, the outer extremities of which terminate on a circle other than that last above referred to, numbers applied on the circle at the end of the first series of radial lines, other numbers applied on the circle at the ends of the second series of radial lines, the highest number applied to a given circle representing the whole number of radial lines terminating on such line, other numbers on said line being divisors of the highest number referred to, the numbers being arranged in the ordered sequence described, substantially as set forth.

6. A chart containing a series of concentric circles, a diametric line extending across said circles, indicators such as alphabetical letters applied along said line to each of said circles, a group or series of equi-distant radial lines the outer ends of which terminate on one of the circles, other groups or series of radial lines the members of each group being equi-distant from each other, and all the lines composing each of which respective groups or series terminate on a circle on which no other group of radial lines terminate, the distribution of the lines of each group or series being different from that of every other series, and figures applied to the outer ends of the radial lines, substantially as set forth.

7. A chart containing a series of concentric circles, a diametric line extending across said circles, indicators such as alphabetical letters applied along said line to each of said circles, a group or series of equi-distant radial lines the outer ends of which terminate on one of the circles, other groups or series of radial lines the members of each group being equi-distant from each other, all the lines composing each of which respective groups or series terminate on a circle on which no other group of radial lines terminates, the distribution of the lines of each group or series being different from that of every other group or series, the upper portion of the diametric line being utilized as one radial line of each of the groups or series, and figures applied to the outer ends of the radial lines, substantially as set forth.

8. A chart containing a series of concentric circles, a diametric line extending across said circles, indicators such as alphabetical letters applied along said line to each of said circles, a group or series of equi-distant radial lines the outer ends of which terminate on one of the circles, other groups or series of radial lines the members of each group being equi-distant from each other, all the lines composing each of which respective groups or series terminate on a circle on which no other group of radial lines terminate, the distribution of the lines of each group or series being different from that of every other group or series, the upper portion of the diametric line being utilized as one radial line of each of the groups or series, and a series of figures applied to the outer ends of the radial lines of each group, the highest number applied to a group being a multiple of each of the others, substantially as set forth.

9. A chart consisting of a body provided with a series of concentric circles, forming a circular figure, a series of groups of radial lines the members of one group of which terminate on one circle, the members of another group of which terminate on another circle, the members of another group of which terminate on another circle, and so on, a rectangular figure inclosing said circles, lines extending perpendicularly to the lines of said rectangular figure and spaced apart a distance equal to the distance from one concentric circle to the other, the inner ends of such last-mentioned lines terminating in the vicinity of said circular figure, substantially as set forth.

10. A chart consisting of a body provided with a series of concentric circles, a series of groups of radial lines, the members of one group of which terminate on one circle, the members of another group of which terminate on another circle, the members of another group of which terminate on another circle, and so on, figures applied to said lines, a rectangular figure inclosing said circles, inwardly extending lines perpendicular to the lines of said rectangular figure and spaced apart a distance equal to the distance from one circle to the other, letters applied to the circles, and corresponding letters applied to the inwardly extending lines, substantially as set forth.

11. A chart consisting of a body provided with a series of concentric circles, a series of groups of radial lines, the members of one group of which terminate on one circle, the members of another group of which terminate on another circle, the members of another group of which terminate on another circle, and so on, a rectangular figure inclosing said circles, inwardly extending lines perpendicular to the lines of said rectangular figure and spaced apart a distance equal to the distance from one circle to the other, such inwardly extending lines terminating in the vicinity of the circles, letters applied to the circles and corresponding letters applied to the inwardly extending lines, diagonal lines extending across the squares formed by said inwardly extending lines, and letters applied in the vicinity of such diagonal lines, substantially as set forth.

12. A chart consisting of a series of circles, divisions applied to one of said circles, numerals applied to the division points indicative of their relation to the circle, a rectangular figure inclosing said circles, points of division indicated on the lines of said rectangular figure which points of division are spaced apart a distance corresponding to that which separates each circle from its neighbor, substantially as set forth.

13. A chart consisting of a series of circles, a sequence of indicating marks applied to the circles in successive order, points of division indicated on one of said circles, a rectangular figure inclosing said circles, points of division indicated on the lines of said rectangular figure at distances apart corresponding to the spaces between the circles, indicating marks applied to the divisions on the lines of the rectangular figures corresponding to the markings or indicators applied to the successive circles, substantially as set forth.

14. A chart consisting of a series of concentric circles, divisions applied to one of said circles, numerals of different values applied to the division points in the arrangement specified, the highest number being the least common multiple of the others, a rectangular figure inclosing said circles, and points of division indicated on the lines of said rectangular figure which points of division are spaced apart a distance corresponding to that which separates each circle from its neighbor, substantially as set forth.

ISAAC M. B. THOMPSON.

Witnesses:
MARY E. BALLINGER,
ELISABETH P. THOMPSON.